US008454150B2

(12) United States Patent
Komatsu

(10) Patent No.: US 8,454,150 B2

(45) Date of Patent: Jun. 4, 2013

(54) PRINTING METHOD USING INK JET RECORDING AND PRINTING APPARATUS

(75) Inventor: Hidehiko Komatsu, Chino (JP)

(73) Assignee: Seiko Epson Corporation (JP)

( * ) Notice: Subject to any disclaimer, the term of this patent is extended or adjusted under 35 U.S.C. 154(b) by 707 days.

(21) Appl. No.: 12/603,846

(22) Filed: Oct. 22, 2009

(65) Prior Publication Data

US 2010/0103236 A1 Apr. 29, 2010

(30) Foreign Application Priority Data

Oct. 29, 2008 (JP) ................................ 2008-277811

(51) Int. Cl.

*B41J 2/01* (2006.01)
*B41J 2/015* (2006.01)
*B41J 2/17* (2006.01)
*C09D 11/00* (2006.01)

(52) U.S. Cl.

USPC ................ 347/102; 347/21; 347/95; 347/96; 347/101; 106/31.27; 523/160; 523/161

(58) Field of Classification Search

USPC ..... 347/9, 20, 21, 95, 96, 100–102; 106/31.6, 106/31.13, 31.27; 523/160, 161

See application file for complete search history.

(56) References Cited

U.S. PATENT DOCUMENTS

| | | | | |
|---|---|---|---|---|
| 4,541,340 | A * | 9/1985 | Peart et al. | 101/470 |
| 5,744,226 | A * | 4/1998 | Olmstead et al. | 428/32.8 |
| 6,087,416 | A | 7/2000 | Pearlstine et al. | |
| 7,219,989 | B2 | 5/2007 | Uerz et al. | |
| 7,338,988 | B2 | 3/2008 | Hesler et al. | |
| 2002/0007765 | A1 | 1/2002 | Sano et al. | |
| 2005/0074601 | A1 | 4/2005 | Onishi | |
| 2005/0176847 | A1 | 8/2005 | Cagle | |
| 2008/0028980 | A1* | 2/2008 | Aoki et al. | 106/31.6 |
| 2008/0152825 | A1* | 6/2008 | Mukai et al. | 427/466 |

FOREIGN PATENT DOCUMENTS

| | | | |
|---|---|---|---|
| JP | 04370166 | A | 12/1992 |
| JP | 2000-044858 | A | 2/2000 |
| JP | 2000-225695 | A | 8/2000 |
| JP | 03509013 | B | 1/2004 |
| JP | 2004001446 | A | 1/2004 |
| JP | 2004-195451 | A | 7/2004 |
| JP | 2004250519 | A | 9/2004 |
| JP | 2004314350 | A | 11/2004 |
| JP | 2005-081754 | A | 3/2005 |
| JP | 2005-220352 | A | 8/2005 |
| JP | 2006-281538 | A | 10/2006 |
| JP | 03937170 | B | 4/2007 |
| JP | 2007-297586 | A | 11/2007 |
| JP | 2008-183843 | A | 8/2008 |

OTHER PUBLICATIONS

Patent Abstract of Japan Publication No. 2000-225695 A Published Aug. 15, 2000.

Patent Abstract of Japan Publication No. 2005-081754 A Published Mar. 31, 2005.

Patent Abstract of Japan Publication No. 2008-183843A Published Aug. 14, 2008.

* cited by examiner

*Primary Examiner* — Charlie Peng
*Assistant Examiner* — Hung Lam
(74) *Attorney, Agent, or Firm* — Harness, Dickey & Pierce, P.L.C.

(57) ABSTRACT

A printing method that uses ink jet recording with a water-based ink set to form an image on a non-ink-absorbing or low-ink-absorbing recording medium, the method includes a printing step including recording with a color ink and recording with a resin ink performed after the recording with the color ink; and a drying step performed during the printing step and/or after the printing step. In the printing method, the water-based ink set includes the color ink containing a water-insoluble coloring agent and the resin ink not containing a coloring agent. The color ink contains the water-insoluble coloring agent, a resin component, a water-soluble solvent, and a surfactant. The resin ink contains a water-soluble resin solvent, a wax, and thermoplastic resin particles as a resin component that are insoluble in water but compatible in the water-soluble resin solvent. A content of the thermoplastic resin particles in the resin ink is 4% by mass or more and 12% by mass or less, and a content of the wax in the resin ink is 0.5% by mass or more and 6% by mass or less.

8 Claims, No Drawings

PRINTING METHOD USING INK JET RECORDING AND PRINTING APPARATUS

BACKGROUND

1. Technical Field

The present invention relates to a printing method that uses ink jet recording to form an image on a non-ink-absorbing or low-ink-absorbing recording medium.

2. Related Art

Ink jet recording methods are printing methods in which recording is performed by causing small ink droplets to fly through the air and causing these droplets to adhere to a recording medium such as paper. With the recent innovative progress of ink jet recording technology, ink jet recording methods have been used even in a field of high-resolution image recording (printing) in which film photos and offset printing have been adopted. Thus, for example, one characteristic required for ink used for the ink jet recording methods is that small ink droplets can be discharged in a stable manner for a long time without disturbing the image.

In recent years, there has been a demand that an image is formed using ink jet recording on a non-ink-absorbing or low-ink-absorbing recording medium in addition to a high-ink-absorbing recording medium. As a printing method that uses ink jet recording to form an image on a non-ink-absorbing or low-ink-absorbing recording medium, JP-A-2000-44858 (Patent Document 1) discloses a method for printing an image on a hydrophobic base material with an ink including water, a glycol solvent, an insoluble coloring agent, a polymer dispersant, a silicon surfactant and a fluorinated surfactant, a water-insoluble graft copolymer binder, and N-methylpyrrolidone. Japanese Patent No. 3937170 (Patent Document 2) discloses a method for printing an image on a hydrophobic surface with an ink including a water-based emulsion polymer having a glass transition temperature of 40 to 80° C., a pigment, and a water-soluble surface agent selected from alkylene glycol monoalkyl ether, 2-pyrrole, N-methylpyrrolidone, and sulfolane. JP-A-2005-220352 (Patent Document 3) discloses an ink jet ink containing a polymer colloid for performing printing on a non-porous base material, the ink jet ink including a volatile co-solvent having a boiling point of 285° C. or less, acid-functionalized polymer colloid particles, and a pigment coloring agent.

JP-A-2004-195451 (Patent Document 4) discloses a composite including a water-based carrier, a humectant, a surfactant, and an addition polymer having an acid value of more than 110, as an overcoat composite for imparting high resistance to a printed image. Furthermore, the above-described Patent Document 1 discloses a printing method including a step of performing application using an overcoat composite obtained by removing a coloring agent from an ink composite.

However, since the non-ink-absorbing or low-ink-absorbing recording medium is a recording medium that does not have an ink absorbing layer or a recording medium that has a scarce ink absorbing layer, ink is not absorbed or is not easily absorbed compared with the case of printing on a high-ink-absorbing recording medium. Therefore, there is a problem in that the dried ink is easily detached due to abrasion.

To improve the abrasion resistance of dried ink, the amount of a coloring agent and a resin component in ink needs only to be increased. In this case, however, it is difficult to ensure discharge stability in high speed printing due to high ink viscosity. In addition, clogging in an ink jet head easily occurs. Therefore, the amount of a coloring agent and a resin component added to ink is limited in consideration of achieving high speed printing and preventing clogging in an ink jet head.

SUMMARY

Accordingly, an advantage of some aspects of the invention is to provide a printing method using ink jet recording that achieves high speed printing on a non-ink-absorbing or low-ink-absorbing recording medium and good abrasion resistance and that does not easily cause clogging in an ink jet head.

In accordance with an embodiment of the invention, a printing method that uses ink jet recording with a water-based ink set to form an image on a non-ink-absorbing or low-ink-absorbing recording medium includes a printing step including recording with a color ink and recording with a resin ink performed after the recording with the color ink; and a drying step performed during the printing step and/or after the printing step. In the printing method, the water-based ink set includes the color ink containing a water-insoluble coloring agent and the resin ink not containing a coloring agent. The color ink contains the water-insoluble coloring agent, a resin component, a water-soluble solvent, and a surfactant. The resin ink contains a water-soluble resin solvent, a wax, and thermoplastic resin particles as a resin component that are insoluble in water but compatible in the water-soluble resin solvent. A content of the thermoplastic resin particles in the resin ink is 4% by mass or more and 12% by mass or less, and a content of the wax in the resin ink is 0.5% by mass or more and 6% by mass or less.

The thermoplastic resin particles preferably have a glass transition temperature of 40° C. or higher.

The color ink preferably contains, as a resin component, the same thermoplastic resin particles and wax as those contained in the resin ink.

The color ink preferably further includes special colors in addition to process colors and the special colors are preferably constituted by orange and green.

A printing apparatus according to an embodiment of the invention uses the printing method described above.

The printing method that uses ink jet recording according to an embodiment of the invention can provide a printing method using ink jet recording that achieves high speed printing on a non-ink-absorbing or low-ink-absorbing recording medium and good abrasion resistance and that does not easily cause clogging in an ink jet head.

DESCRIPTION OF EXEMPLARY EMBODIMENTS

In accordance with an embodiment of the invention, a printing method that uses ink jet recording with a water-based ink set to form an image on a non-ink-absorbing or low-ink-absorbing recording medium includes a printing step including recording with a color ink and recording with a resin ink performed after the recording with the color ink; and a drying step performed during the printing step and/or after the printing step. In the printing method, the water-based ink set includes the color ink containing a water-insoluble coloring agent and the resin ink not containing a coloring agent. The color ink contains the water-insoluble coloring agent, a resin component, a water-soluble solvent, and a surfactant. The resin ink contains a water-soluble resin solvent, a wax, and thermoplastic resin particles as a resin component that are insoluble in water but compatible in the water-soluble resin solvent. A content of the thermoplastic resin particles in the resin ink is 4% by mass or more and 12% by mass or less, and a content of the wax in the resin ink is 0.5% by mass or more and 6% by mass or less.

Recording Medium

In this embodiment, a recording medium subjected to printing is a non-ink-absorbing or low-ink-absorbing recording medium. The non-ink-absorbing or low-ink-absorbing recording medium is a recording medium that does not have an ink absorbing layer or a recording medium that has a scarce ink absorbing layer. Quantitatively, the non-ink-absorbing or low-ink-absorbing recording medium is a recording medium whose water absorption amount on a print surface for 30 $msec^{1/2}$ from the contact with water is 10 $mL/m^2$ or less in a Bristow method. A Bristow method is the most common method for measuring a liquid absorption amount in a short time and is adopted by Japan Technical Association of the Pulp and Paper Industry (Japan TAPPI). The detail of the test method is described in Standard No. 51 "Paper and Paperboard—Liquid Absorbency Test Method—Bristow Method" of "Japan TAPPI Paper and Pulp Test Methods 2000". Examples of the non-ink-absorbing recording medium include plastic films whose surface is not processed for ink jet printing (that is, an ink absorption layer is not formed), media obtained by coating a base material such as paper with a plastic, and media to which a plastic film is attached. Plastic herein is polyvinyl chloride, polyethylene terephthalate, polycarbonate, polystyrene, polyurethane, polyethylene, polypropylene, or the like. Examples of the low-ink-absorbing recording medium include printing paper such as art paper, coated paper, and matte paper.

Water-Based Ink Set

A water-based ink set used in the printing method according to this embodiment includes a color ink containing a coloring agent and a resin ink not containing a coloring agent. The color ink is an ink for forming color and monochrome images on a recording medium. The resin ink is mainly used to impart abrasion resistance to printed materials by printing an image with the resin ink before, during, or after the printing of the color ink. Hereinafter, each of the inks will be described.

Color Ink

As described above, the color ink includes at least a water-insoluble coloring agent, a water-soluble and/or water-insoluble resin component, a water-soluble solvent, and a surfactant. Each of the components constituting the color ink will now be described.

Coloring Agent

Water-insoluble dyes or pigments are used as the water-insoluble coloring agent, and pigments are preferred. This is because printed materials that are printed using an ink composed of a pigment are excellent in durability such as water resistance, gas resistance, and light resistance. Known inorganic pigments, organic pigments, and carbon blacks can be used as the pigment. Among these pigments, carbon blacks and organic pigments are preferred because they have good color development and do not easily precipitate during their dispersion due to their low specific gravity.

Examples of the carbon blacks include furnace black, lampblack, acetylene black, and channel black (C.I. Pigment Black 7). Examples of commercially available carbon blacks include No. 2300, 900, MCF88, No. 20B, No. 33, No. 40, No. 45, No. 52, MA7, MA8, MA77, MA100, and No. 2200B (all trade name, available from Mitsubishi Chemical Corporation); Color Black FW1, FW2, FW2V, FW18, FW200, S150, S160, and S170, Printex 35, U, V, and 140U, and Special Black 6, 5, 4A, 4, and 250 (all trade name, available from Degussa Corp.); Conductex SC and Raven 1255, 5750, 5250, 5000, 3500, and 700 (all trade name, available from Colombia Carbon Corp.); and Regal 400R, 330R, and 660R, Mogal L, Monarch 700, 800, 880, 900, 1000, 1100, 1300, and 1400, and Elftex 12 (all trade name, available from CABOT Corporation). They are merely an example of carbon blacks that are suitable for the invention, and do not limit the invention. These carbon blacks may be used alone or in combination. The solid content of the pigment in the total amount of black ink is 0.5 to 12% by mass, preferably 2 to 8% by mass.

Examples of the organic pigments include quinacridone pigments, quinacridonequinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, and azo pigments.

The following is an example of the organic pigments.

Examples of the pigments used for a cyan ink include C.I. Pigment Blue 1, 2, 3, 15:3, 15:4, 16, 22, and 60 and C.I. Vat Blue 4 and 60. One pigment or a mixture of pigments selected from the group consisting of C.I. Pigment Blue 15:3, 15:4, and 60 are preferably used.

Examples of the pigments used for a magenta ink include C.I. Pigment Red 5, 7, 12, 48(Ca), 48(Mn), 57(Ca), 57:1, 112, 122, 123, 168, 184, and 202 and C.I. Pigment Violet 19. One pigment or a mixture of pigments selected from the group consisting of C.I. Pigment Red 122, 202, and 209 and C.I. Pigment Violet 19 are preferably used.

Examples of the pigments used for a yellow ink include C.I. Pigment Yellow 1, 2, 3, 12, 13, 14C, 16, 17, 73, 74, 75, 83, 93, 95, 97, 98, 109, 110, 114, 128, 129, 138, 150, 151, 154, 155, 180, and 185. One pigment or a mixture of pigments selected from the group consisting of C.I. Pigment Yellow 74, 109, 110, 128, 138, and 180 are preferably used.

Special colors are preferably included in the color ink in addition to process colors such as yellow, magenta, cyan, and black. More preferably, the special colors are constituted by orange and green. Since the non-ink-absorbing or low-ink-absorbing recording medium has no or little absorption layer/color development layer of ink, its color developing properties are poor compared with the case where an image is printed on an ink jet recording medium having high absorbency. Therefore, by further adding special colors to process colors, high color development can be achieved without increasing absorbency. Examples of the special colors include red, green, blue, orange, and violet, and orange and green are particularly preferred.

The pigment used for an orange ink is C.I. Pigment Orange 36 or 43 or a mixture thereof.

The pigment used for a green ink is C.I. Pigment Green 7 or 36 or a mixture thereof.

These pigments may be used by being dispersed using a dispersing resin. Alternatively, they may be used as a self-dispersing pigment by oxidizing or sulfonating the pigment surface using ozone, hypochlorous acid, fuming sulfuric acid, or the like.

The solid content of the pigment in the total amount of each color ink is about 0.5 to 15% by mass, preferably about 2 to 10% by mass.

Resin Component

A dispersant for dispersing the pigment in a water-based medium is preferably contained as the resin component. A dispersant that is commonly used for preparing a pigment dispersing liquid, for example, a polymer dispersant can be preferably used.

Dispersant

Examples of the preferable dispersant include polyacrylic acid, polymethacrylic acid, acrylic acid-acrylonitrile copolymers, vinyl acetate-acrylate copolymers, acrylic acid-alkyl acrylate copolymers, styrene-acrylic acid copolymers, styrene-methacrylic acid copolymers, styrene-acrylic acid-alkyl acrylate copolymers, styrene-methacrylic acid-alkyl acrylate copolymers, styrene-α-methylstyrene-acrylic acid copolymers, styrene-α-methylstyrene-acrylic acid-alkyl acrylate copolymers, styrene-maleic acid copolymers, vinylnaphthalene-maleic acid copolymers, vinyl acetate-ethylene copolymers, vinyl acetate-vinylethylene fatty acid copolymers, vinyl acetate-maleate copolymers, vinyl acetate-crotonic acid copolymers, and vinyl acetate-acrylic acid copolymers. A dispersant that is not easily dissolved in a solvent or the like added to an ink is preferred. For example, a terminal of a hydrophilic group is preferably esterified compared with the case where the terminal remains acrylic acid.

These copolymers preferably have a weight-average molecular weight of about 3000 to 50000, more preferably about 5000 to 30000.

The additive amount of the dispersant may be in the range that achieves stable dispersion of a pigment and maintains other effects according to the invention.

Furthermore, a wax and thermoplastic resin particles that are insoluble in water but compatible in a water-soluble resin solvent are preferably contained as a resin component. The thermoplastic resin particles can improve the abrasion resistance of the color ink after drying. The wax can improve the slip properties of the color ink after drying, which can improve abrasion resistance. The thermoplastic resin particles and wax are exemplified in the description of a resin ink.

When the color ink contains the thermoplastic resin particles as a resin component and wax, it preferably contains the same thermoplastic resin particles and wax as those contained in a resin ink. By containing the same thermoplastic resin particles and wax as those contained in a resin ink, the affinity between the resin components is improved. Thus, the detachment at an interface between the color ink and the resin ink can be prevented.

Water-Soluble Solvent

Together with a surfactant described later, a water-soluble solvent increases the wettability of the color ink to a recording medium to achieve uniform wettability. Therefore, it is preferable to contain the water-soluble solvent in the color ink because printing unevenness and blurs of ink can be reduced. Monohydric alcohols or polyhydric alcohols and the derivatives thereof are exemplified as the water-soluble solvent.

A monohydric alcohol having particularly 1 to 4 carbon atoms such as methanol, ethanol, n-propanol, propanol, or n-butanol can be used as the monohydric alcohol.

A divalent to pentavalent alcohol having 2 to 6 carbon atoms and an ether or a partial ether between the divalent to pentavalent alcohol and a lower alcohol having 1 to 4 carbon atoms can be used as the polyhydric alcohol and the derivative thereof. A polyhydric alcohol derivative herein is an alcohol derivative in which at least one hydroxyl group is etherified and is not a polyhydric alcohol itself that does not include an etherified hydroxyl group.

Examples of the polyhydric alcohol and the lower alkyl ether thereof include diols such as 1,2-hexanediol, 1,3-hexanediol, 1,2-heptanediol, 1,3-heptanediol, 1,2-octanediol, 1,3-octanediol, and 1,2-pentanediol; mono-, di-, or triethylene glycol-mono- or dialkyl ether; and mono-, di-, or tripropylene glycol-mono- or dialkyl ether. Preferably, 1,2-hexanediol, triethylene glycol monobutyl ether, diethylene glycol monobutyl ether, diethylene glycol monopropyl ether, diethylene glycol monopentyl ether, and propylene glycol monobutyl ether are exemplified.

The content of the water-soluble solvent in the total amount of each color ink is, for example, 0.5 to 15.0% by mass, preferably 1.0 to 8.0% by mass.

Surfactant

Together with the water-soluble solvent described above, a surfactant increases the wettability of the color ink to a recording medium to achieve uniform wettability. A silicon surfactant and an acetylenic glycol surfactant are preferred.

The silicon surfactant uniformly spreads ink so as to prevent printing unevenness and blurs of the ink on a recording medium.

Polysiloxane compounds are preferably used as the silicon surfactant, and polyether-modified organosiloxane or the like is exemplified. Examples of the polyether-modified organosiloxane include BYK-306, BYK-307, BYK-333, BYK-341, BYK-345, BYK-346, BYK-347, and BYK-348 (trade name, available from BYK Japan KK); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade name, available from Shin-Etsu Chemical Co., Ltd.). BYK-348 is preferred.

The content of the silicon surfactant in the total amount of each color ink is preferably 0.1 to 1.5% by mass. When the content of the silicon surfactant is less than 0.1% by mass, ink does not easily spread uniformly on a recording medium, which easily causes printing unevenness and blurs of the ink. In contrast, when the content of the silicon surfactant is more than 1.5 by mass, the preservation stability and discharge stability of a water-based ink composite sometimes cannot be ensured.

An acetylenic glycol surfactant has good ability to appropriately keep surface tension and interfacial tension and has almost no foaming property compared with other surfactants. A color ink containing an acetylenic glycol surfactant can appropriately keep surface tension and the interfacial tension between ink on a head nozzle face or the like and a printer member that is in contact with the ink. Therefore, when such a color ink is used in ink jet recording, the discharge stability can be improved. In addition, since the color ink containing an acetylenic glycol surfactant exhibits good wettability and permeability to a recording medium, a high resolution image having little printing unevenness and few blurs of the ink can be obtained.

Examples of the acetylenic glycol surfactant include Surfynol 104, 104E, 104H, 104A, 104BC, 104DPM, 104PA, 104PG-50, 104S, 420, 440, 465, 485, SE, SE-F, 504, 61, 82, DF37, DF110D, CT111, CT121, CT131, CT136, TG, and GA (all trade name, available from Air Products and Chemicals. Inc.); Olfine B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (all trade name, available from Nissin Chemical Industry Co., Ltd.); and Acetylenol E00, E00P, E40, and E100 (all trade name, available from Kawaken Fine Chemicals Co., Ltd.). Surfynol 104PG-50 and DF110D are preferred.

The content of the acetylenic glycol surfactant in the total amount of each color ink is preferably 0.05 to 1.0% by mass. When the content of the acetylenic glycol surfactant is less than 0.05% by mass, ink does not easily spread uniformly on a recording medium, which easily causes printing unevenness and blurs of the ink. In contrast, when the content of the acetylenic glycol surfactant is more than 1.0% by mass, the preservation stability and discharge stability of a color ink sometimes cannot be ensured.

In particular, a combination of a silicon surfactant and an acetylenic glycol surfactant having a hydrophile-lypophile balance (HLB) of 6 or less is preferred.

By combining the water-soluble solvent and the surfactant, the surface tension of a water-based ink is preferably adjusted to 23.0 to 40.0 mN/m, more preferably 25.0 to 35.0 mN/m.

Water

Water is a principal medium of the water-based ink. Ion exchanged water, ultrafiltered water, reverse osmosis water, pure water such as distilled water, or ultrapure water can be preferably used as water to reduce ionic impurities as much as possible. When a pigment-dispersed solution and a water-based ink using the solution are stored for a long time, water sterilized by ultraviolet irradiation, addition of hydrogen peroxide water, or the like can prevent the growth of molds and bacteria.

Other Components of Color Ink

Furthermore, a water-soluble resin solvent, a humectant, a preservative/fungicide, a pH adjuster, a solubilizing agent, an antioxidant, and a metal trapping agent are exemplified as optional additives. For the water-soluble resin solvent, refer to the description of a resin ink.

A humectant that is not left in a film during drying is preferred. Examples of the humectant include ethylene glycol, diethylene glycol, propylene glycol, dipropylene glycol, 1,3-propanediol, 1,4-butanediol, hexylene glycol, and 2,3-butanediol.

Examples of the preservative/fungicide include sodium benzoate, sodium pentachlorophenol, sodium 2-pyridinethiol-1-oxide, sodium sorbate, sodium dehydroacetate, and 1,2-dibenzisothiazolin-3-one (Proxel CRL, BDN, GXL, XL-2, and TN available from ICI Corp.).

Examples of the pH adjuster include inorganic alkalis such as sodium hydroxide and potassium hydroxide, ammonia, diethanolamine, triethanolamine, triisopropanolamine, morpholine, potassium dihydrogen phosphate, and disodium hydrogen phosphate.

Examples of the solubilizing agent include urea, thiourea, dimethylurea, tetraethylurea, allophanates such as allophanate and methylallophanate, and biurets such as biuret, dimethylbiuret, and tetramethylbiuret.

An example of the metal trapping agent is disodium ethylenediaminetetraacetate.

Resin Ink

A resin ink includes a water-soluble resin solvent, a wax, and thermoplastic resin particles as a resin component that are insoluble in water but compatible in the water-soluble resin solvent. Being compatible means a combination in which, when resin particles are mixed in a resin solvent, the resin particles are dissolved or swell. Each of the components will now be described.

Water-Soluble Resin Solvent

The water-soluble resin solvent is selected from water-soluble solvents that are compatible with the resin particles added to the same resin ink. Although an optimum combination varies in accordance with a resin to be used, for example, water-soluble heterocyclic compounds and water-soluble alkylene glycol alkyl ethers are preferred.

Examples of the water-soluble resin solvent include pyrrolidones such as N-methyl-2-pyrrolidone, N-ethyl-2-pyrrolidone, N-vinyl-2-pyrrolidone, and 2-pyrrolidone, dimethyl sulfoxide, ϵ-caprolactam, methyl lactate, ethyl lactate, isopropyl lactate, butyl lactate, ethylene glycol monomethyl ether, ethylene glycol dimethyl ether, ethylene glycol monomethyl ether acetate, diethylene glycol monomethyl ether, diethylene glycol dimethyl ether, diethylene glycol ethylmethyl ether, diethylene glycol diethyl ether, diethylene glycol isopropyl ether, propylene glycol monomethyl ether, propylene glycol dimethyl ether, dipropylene glycol monomethyl ether, dipropylene glycol dimethyl ether, dipropylene glycol monopropyl ether, and 1,4-dioxane. In particular, pyrrolidones and alkylene glycol monoalkyl ethers such as propylene glycol monomethyl ether, dipropylene glycol monomethyl ether, and dipropylene glycol monopropyl ether are preferred in consideration of preservation stability of a resin ink, sufficient drying rate, and promotion of the film formation of resin particles.

The water-soluble resin solvent is added to the resin ink, but may be added to the color ink. This is effective for further strengthening a film formed of the resin particles.

The additive amount of the water-soluble resin solvent in the total amount of the resin ink is preferably 1.0 to 20.0% by mass, more preferably 2.0 to 15.0% by mass. When the additive amount of the water-soluble resin solvent is less than 1.0%, there is a difficulty in film formation of the resin particles in the resin ink and thus insufficient solidification/fusion of the resin ink may be caused. On the other hand, when the additive amount of the water-soluble resin solvent is more than 20.0% by mass, the preservation stability of the resin ink may be deteriorated.

Thermoplastic Resin Particles

The thermoplastic resin particles can form a strong resin film after drying of the resin ink and can form a film at a temperature lower than the original glass transition temperature of the resin particles when the resin particles are compatible with the water-soluble resin solvent. By using the resin particles that are insoluble in water, the viscosity of each ink can be reduced and the discharge stability can be ensured in high speed printing while a sufficient amount of resin component is added to the resin ink.

It is believed that the thermoplastic resin particles are present without being dissolved in the water-soluble resin solvent in the ink when being stored under normal conditions (room temperature). In other words, because the principal ingredient constituting more than half of the ink is water and the additive amount of the water-soluble resin solvent is as low as 20% by mass or less, the thermoplastic resin particles are not dissolved immediately even if the thermoplastic resin particles and the water-soluble resin solvent coexist in the ink. However, when the ink is discharged on a recording medium from an ink jet head and dried, water that is a principal ingredient in the ink starts to evaporate first. Consequently, the water-soluble resin solvent is concentrated in the ink and the thermoplastic resin particles are dissolved. After the completion of water evaporation, a solvent component that is an easily-evaporating component after water starts to evaporate. Consequently, the dissolved thermoplastic resin particles (actually, not particles because they are dissolved) are solidified by forming a strong film with the evaporation of the water-soluble resin solvent. Finally, only a coloring component that is a solid component and another solid component such as the thermoplastic resin particles that have formed a film so as to cover the coloring component are present on a recording medium.

Examples of the thermoplastic resin particles that are insoluble in water include polyacrylic acid, polymethacrylic acid, polymethacrylate, polyethylacrylic acid, styrene-butadiene copolymers, polybutadiene, acrylonitrile-butadiene copolymers, chloroprene copolymers, fluorine resins, vinylidene fluoride, polyolefin resins, cellulose, styrene-acrylic acid copolymers, styrene-methacrylic acid copolymers, polystyrene, styrene-acrylamide copolymers, polyisobutyl acrylate, polyacrylonitrile, polyvinyl acetate, polyvinyl acetal, polyamide, rosin resins, polyethylene, polycarbonate, vinylidene chloride resins, cellulose resins, vinyl acetate resins, ethylene-vinyl acetate copolymers, vinyl acetate-acrylate copolymers, vinyl chloride resins, polyurethane, and rosin esters. However, the thermoplastic resin particles are not limited to these compounds.

The thermoplastic resin particles may be mixed with other components in the water-based ink as fine particulate powder, but are preferably included in the ink as a resin emulsion. This is because, since resin particles are sometimes dispersed insufficiently when they are added to the ink in a particle form, an emulsion form is preferred in terms of their dispersion. An acrylic emulsion is preferable in terms of preservation stability of the resin ink. A styrene-acrylic acid copolymer emulsion is more preferable.

In the specification of this application, "resin particles" include a water-insoluble resin that disperses or is dispersed in a dispersion medium mainly composed of water in a particulate form and a dried matter thereof. In addition, "emulsion" includes solid/liquid dispersing elements called dispersion, latex, and suspension.

When the resin is obtained in an emulsion form, the emulsion can be prepared by mixing the resin particles with water and a surfactant (if necessary). For example, the emulsion of an acrylic resin or a styrene-acrylic acid copolymer resin can be obtained by mixing a (meth)acrylate resin or a styrene-(meth)acrylate resin with water. If necessary, the emulsion can be obtained by mixing a (meth)acrylate resin and a surfactant with water. The mixing ratio of the resin component and the surfactant is preferably about 50:1 to 5:1. When the amount of the surfactant does not satisfy the ratio, an emulsion is not easily formed. When the amount of the surfactant exceeds the ratio, water resistance of the ink is decreased and adhesion tends to be deteriorated.

A commercially available resin emulsion can be used as the resin emulsion. Examples of the resin emulsion include Microgel E-1002 and E-5002 (styrene-acrylic resin emulsion available from NIPPON PAINT Co., Ltd.), Bon Coat 4001 (acrylic resin emulsion available from Dainippon Ink and Chemicals Inc.), Bon Coat 5454 (styrene-acrylic resin emulsion available from Dainippon Ink and Chemicals Inc.), SAE1014 (styrene-acrylic resin emulsion available from ZEON CORPORATION), and Saibinol SK-200 (acrylic resin emulsion available from SAIDEN CHEMICAL INDUSTRY CO., LTD.).

The solid content of the thermoplastic resin particles in the total amount of the resin ink is preferably 4 to 12%; by mass, more preferably 6 to 10% by mass. For the preferable content range of the thermoplastic resin particles, the upper limit is stipulated in consideration of ink jet optimum physical properties of the resin ink and reliability (e.g., clogging and discharge stability) and the lower limit is stipulated so as to effectively achieve the advantages (e.g., abrasion resistance) of the invention.

The glass transition temperature of the thermoplastic resin particles is preferably 40° C. or higher, more preferably 60° C. or higher, more preferably 80° C. or higher. By using such thermoplastic resin particles, dried ink can maintain a strong film in a normal range of use and the abrasion resistance of the ink film can be improved. In contrast, when the glass transition temperature is less than room temperature, the abrasion resistance of print images after drying is unsatisfactory and nozzle clogging of an ink jet head is easily caused. In the printing method according to an embodiment of the invention in particular, quick-drying property of ink is improved because printing is performed on a non-ink-absorbing recording medium. Therefore, clogging in practical use is a problem in the case of a resin having a glass transition temperature lower than room temperature.

In the invention, glass transition temperature (Tg) can be measured by a typical method, for example, using a thermal analysis instrument such as a differential scanning calorimeter (DSC). An example of the thermal analysis instrument is SSC5000 available from Seiko Electronics Co., Ltd. When a resin is a copolymer, glass transition temperature (Tg) can be evaluated as a calculated glass transition temperature. The glass transition temperature (Tg) of a copolymer and its evaluation method are described below. The glass transition temperature (Tg) of a copolymer having a certain monomer composition can be calculated from a Fox equation. A Fox equation herein is used to calculate Tg of a copolymer on the basis of Tg of homopolymers of the individual monomers constituting the copolymer. The detail is described in Bulletin of the American Physical Society, Series 2, vol. 1, no. 3, pp 123, 1956. The term "calculated glass transition temperature" used in this specification of the invention includes a glass transition temperature calculated from the Fox equation. For example, values described in The Polymer Data Handbook Basic version pp 525 to 546 (compiled by The Society of Polymer Science, Japan) or actual values measured by a typical method can be used as Tg of homopolymers of monomers that is necessary for calculating Tg of a copolymer from the Fox equation.

Wax

Wax decreases the frictional resistance of an ink film surface after drying. Examples of a component constituting the wax include plant or animal waxes such as carnauba wax, candelilla wax, beeswax, rice wax, and lanolin; petroleum waxes such as paraffin wax, microcrystalline wax, polyethylene wax, polyethylene oxide wax, and petrolatum; mineral waxes such as montan wax and ozokerite; synthetic waxes such as carbon wax, Hoechst wax, polyolefin wax, and stearic acid amide; natural/synthetic wax emulsions such as α-olefin-maleic anhydride copolymers; and blend waxes. These waxes can be used alone or in combination. Among these waxes, polyolefin wax, particularly polyethylene wax and polypropylene wax are preferable. Furthermore, polyethylene wax is more preferable in consideration of abrasion resistance to a non-ink-absorbing or low-ink-absorbing recording medium. A commercially available wax can be used directly. Examples of the commercially available wax include Nopcoat PEM17 (trade name, available from SAN NOPCO Limited), Chemipearl W4005 (trade name, available from Mitsui Chemicals, Inc.), and AQUACER515 (trade name, available from BYK Japan KK).

The solid content of the wax in the resin ink is preferably 0.5 to 6% by mass, more preferably 1 to 3% by mass. For the preferable content range of the wax, the upper limit is stipulated in consideration of ink jet optimum physical properties of the resin ink and reliability (e.g., clogging and discharge stability) and the lower limit is stipulated so as to effectively achieve the advantages (e.g., abrasion resistance) of the invention.

The reason why the abrasion resistance of printed materials is good when the thermoplastic resin particles and the wax are used in combination is still unclear, but can be inferred as follows. The thermoplastic resin particles have characteristics that firmly fix a color ink on a recording medium and strengthen a resin film after drying. The wax, on the other hand, has characteristics that decrease the frictional resistance of a resin film surface. As a result, a resin film that is not easily shaved off due to rubbing from the outside and is not easily detached from the recording medium can be formed. Accordingly, it is believed that the abrasion resistance of printed materials is improved.

Other Components of Resin Ink

The resin ink optionally includes a water-soluble solvent and a surfactant as other components. The same water-soluble solvent and surfactant as those used in the color ink can be used. The resin ink also preferably includes a silicon surfactant and an acetylenic glycol surfactant having an HLB of 6 or less. The combination of the silicon surfactant and acetylenic glycol surfactant allows ink to be wet on various non-ink-absorbing to low-ink-absorbing recording media, which can provide printed materials having, for example, little printing unevenness. For each of the components, the same materials as those described in the color ink can be used. The additive amount can be suitably adjusted in accordance with types of recording media and inks.

The resin ink includes water as a principal medium as with the color ink. Furthermore, a humectant, a preservative/fungicide, a pH adjuster, a solubilizing agent, an antioxidant, and a metal trapping agent are exemplified as optional additives. For these materials, the same materials as those described in the color ink can be used.

Printing Method

The printing method according to this embodiment includes a step of printing an image with a color ink and a resin ink on a recording medium using ink jet recording.

In a printing step, after a color ink is fixed on a recording medium, a resin ink is fixed on the color ink. Since the color ink is fixed and the resin ink is then fixed on the color ink, a large amount of resin ink component is contained on the surface side of the print face, which can improve the abrasion resistance of the print face.

With ink jet recording, the resin ink can be selectively attached to only an area where the color ink has been attached to, which can minimize the amount of the resin ink consumed. Furthermore, use of ink jet recording can suppress curling observed after drying when a large amount of resin ink is attached to the entire sheet.

Although multipass printing or single-pass printing may be adopted as a method for recording an image on a recording medium with the color ink and resin ink, single-pass printing or two-pass printing is preferred in terms of high speed printing. Single-pass printing herein is a method for recording all dots to be formed in the scanning region through a single scan of a recording head. That is to say, single-pass printing of the color ink and resin ink means that all dots of the color ink and resin ink to be recorded in the scanning region of a recording head are completely recorded through a single scan of the recording head. Two-pass printing is a method for recording all dots to be recorded in the scanning region of a recording head through two scans of the recording head. In addition, single-pass printing has, for example, a method in which dots are recorded through a single scan of a recording head in a main scanning direction, a recording medium is then moved in a subscanning direction by a recording region, and these actions are repeated to form the overall image; and a method in which a recording head is fixed and a recording medium is moved to form an image. Both of the methods can be preferably used. Single-pass or two-pass recording achieves high speed printing, which increases productivity of recorded materials.

For example, printing resolution of each color is 360 dpi (dots per inch) or more, the resolution ratio of an ink jet nozzle to the printing resolution is in a range of 1 to 2, and ink viscosity is 1.5 to 15 mPa·s (20° C.). To achieve high image quality, a high printing resolution of 360 dpi or more is desired. To achieve high speed printing, the resolution ratio of an ink jet nozzle to the printing resolution is in a range of 1 to 2. To supply ink to a head from an ink tank in a stable manner, ink viscosity is preferably 1.5 to 15 mPa·s (20° C.). For example, when the resolution of a nozzle is 360 dpi, the above-described requirements are preferred to perform printing at 360 to 720 dpi.

In the high speed printing described above, the ink viscosity is preferably low. In this embodiment, by separating the color ink from the resin ink, a sufficient amount of coloring agent and a sufficient amount of resin component are respectively added to the color ink and the resin ink while the viscosity of each of the inks can be reduced. This can ensure discharge stability in high speed printing.

For example, the viscosities of the resin ink and the ink composite at 20° C. are preferably 1.5 to 15 mPa·s, more preferably 1.5 to 10 mPa·s. Preferably, the viscosities of the resin ink and the ink composite are substantially the same. For instance, the viscosity of one of the resin ink and ink composite is adjusted to 50 to 200% of the viscosity of the other. Thus, when the resin ink and ink composite are discharged from an ink jet recording head, the same recording head, flow-path structure, and driving circuit can be used, which is advantageous.

The printing method according to this embodiment preferably includes a drying step during and/or after printing. With a drying step, the evaporation of a liquid medium (specifically, water and water-soluble solvent) in the color ink and the resin ink is facilitated, and a high quality image having little printing unevenness and few blurs and a recording material having abrasion resistance can be obtained in a short time. Moreover, creases of a recording medium can be prevented and curling of a recording medium can be effectively prevented.

The application of heat during drying facilitates the fusion of resin particles contained in the color ink and the resin ink, which allows a good film to be formed. As a result, the abrasion resistance of recording materials is further improved. The heating temperature is not particularly limited as long as a liquid medium contained in the color ink and the resin ink evaporates and a resin film is formed. The above-mentioned effects are produced at 40° C. or more. The heating temperature is preferably about 40 to 150° C., more preferably about 40 to 80° C. When the temperature exceeds 100° C., the recording medium is, for instance, transformed and there may be malfunctions in transport. Furthermore, when the ink that is present around a nozzle of an ink jet head is subjected to the influence of the heat and a water-soluble resin solvent in the ink is concentrated with water evaporation, thermoplastic resin particles contained in the ink that is present around the nozzle are dissolved and dried. Consequently, problems such as nozzle clogging and the like frequently arise.

Drying/heating time is not particularly limited as long as a liquid medium contained in the color ink and the resin ink evaporates and a resin film is formed. The drying/heating time can be suitably adjusted in consideration of types of liquid media and resins used and printing speed.

A drying method is not particularly limited as long as the method facilitates the volatilization of the liquid medium contained in the color ink and the resin ink. Examples of the drying method include a method for applying heat to a recording medium before or after printing, a method for blowing air to a recording medium after printing, and a method in which the two methods are combined. Specifically, forced-air heating, radiation heating, conduction heating, high-frequency heating, microwave heating, dry air blowing, and the like are exemplified.

EXAMPLES

Hereinafter, the invention is further described in detail with Examples. However, the invention is not limited to Examples.

Color Ink

Each component was blended with the blending quantity (percent by mass of each component to the total mass of a color ink) shown in Table 1 to obtain a color ink set A1.

TABLE 1

| Color ink | | A1 | | | | | |
|---|---|---|---|---|---|---|---|
| Coloring agent | C.I. Pigment Blue 15:3 | 4 | | | | | |
| | C.I. Pigment Red 122 | | 4 | | | | |
| | C.I. Pigment Yellow 180 | | | 4 | | | |
| | C.I. Pigment Orange 43 | | | | 4 | | |
| | C.I. Pigment Green 36 | | | | | 4 | |
| | MA77 (Carbon Black) | | | | | | 4 |
| Dispersant | acrylic acid-acrylate copolymer (*1) | 2 | 2 | 2 | 2 | 2 | 2 |
| Thermoplastic resin particle | styrene-acrylic acid copolymer (Tg = 80° C., ϕ = 50) (*2) | 2 | 2 | 2 | 2 | 2 | 2 |
| Wax | polyethylene wax emulsion (melting point 135° C.) | 0.5 | 0.5 | 0.5 | 0.5 | 0.5 | 0.5 |
| Water-soluble solvent | 1,2-hexanediol | 5 | 5 | 5 | 5 | 5 | 5 |
| Surfactant | BYK-348 (*3) | 0.5 | 0.5 | 0.5 | 0.5 | 0.5 | 0.5 |
| | Surfynol DF-110D (*4) | 0.2 | 0.2 | 0.2 | 0.2 | 0.2 | 0.2 |
| Water-soluble resin solvent | 2-pyrrolidone | 5 | 5 | 5 | 5 | 5 | 5 |
| Humectant | propylene glycol | 10 | 10 | 10 | 10 | 10 | 10 |
| Balance water | ion exchanged water | Residual quantity | Residual quantity | Residual quantity | Residual quantity | Residual quantity | Residual quantity |
| Total | | 100 | 100 | 100 | 100 | 100 | 100 |

(*1) acrylic acid-acrylate copolymer molecular weight 25000, glass transition temperature 80° C., acid value 180
(*2) styrene-acrylic acid copolymer molecular weight 50000, acid value 130, average particle size 75 nm
(*3) BYK-348 trade name, polyether-modified organosiloxane available from BYK Japan KK
(*4) Surfynol DF-110D trade name, product of Nissin Chemical Industry Co., Ltd., HLB = 3

Resin Ink

Each component was blended with the blending quantity (percent by mass of each component to the total mass of a resin ink) shown in Table 2 to obtain resin inks B1 to B14.

TABLE 2

| Resin ink | | B1 | B2 | B3 | B4 | B5 | B6 | B7 | B8 | B9 | B10 | B11 | B12 | B13 | B14 | B15 | B16 |
|---|---|---|---|---|---|---|---|---|---|---|---|---|---|---|---|---|---|
| Thermoplastic resin particle | styrene-acrylic acid copolymer (Tg = 80° C., ϕ = 50) | 8 | 10 | 12 | 13 | 6 | 4 | 3 | 8 | 8 | 8 | 8 | 8 | 8 | | | |
| | styrene-acrylic acid copolymer (Tg = 60° C., ϕ = 57) | | | | | | | | | | | | | | 8 | | |
| | styrene-acrylic acid copolymer (Tg = 40° C., ϕ = 65) | | | | | | | | | | | | | | | 8 | |
| | styrene-acrylic acid copolymer (Tg = 20° C., ϕ = 68) | | | | | | | | | | | | | | | | 8 |
| | polyethylene wax emulsion (melting point 135° C.) | 2 | 2 | 2 | 2 | 2 | 2 | 2 | 1 | 0.5 | 0.2 | 4 | 6 | 7 | 2 | 2 | 2 |
| Water-soluble solvent | 1,2-hexanediol | 5 | 5 | 5 | 5 | 5 | 5 | 5 | 5 | 5 | 5 | 5 | 5 | 5 | 5 | 5 | 5 |
| Surfactant | BYK-348 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Water-soluble resin solvent | 2-pyrrolidone | 5 | 5 | 5 | 5 | 5 | 5 | 5 | 5 | 5 | 5 | 5 | 5 | 5 | 5 | 5 | 5 |
| | dipropylene glycol monopropyl ether | 3 | 3 | 3 | 3 | 3 | 3 | 3 | 3 | 3 | 3 | 3 | 3 | 3 | 3 | 3 | 3 |
| Humectant | propylene glycol | 3 | 3 | 3 | 3 | 3 | 3 | 3 | 3 | 3 | 3 | 3 | 3 | 3 | 3 | 3 | 3 |
| Balance water | ion exchanged water | rq* | rq | rq | rq | rq | rq | rq | rq | rq | rq | rq | rq | rq | rq | rq | rq |
| Total | | 100 | 100 | 100 | 100 | 100 | 100 | 100 | 100 | 100 | 100 | 100 | 100 | 100 | 100 | 100 | 100 |

*rq Residual quantity

Ink Set

An ink set including a color ink set A1 shown in Table 1 and one of resin inks B1 to 313 shown in Table 2 was prepared and printing was performed by an ink jet method under the conditions (Examples 1 to 11 and Comparative Examples 1 to 4) shown in Table 3. In these Examples, a film composed of polyethylene terephthalate (PET) and a film composed of polyvinyl chloride were used as a non-ink-absorbing recording medium, and a paper-based medium was used as a low-ink-absorbing recording medium. Patches and images were printed on these three types of recording media using the ink sets described in Table 3 at a printing resolution of 360 dpi with Ink Jet Printer PX-G930 (trade name, available from SEIKO EPSON CORPORATION, nozzle resolution 180 dpi) that was adjusted to 40° C. by attaching a heater to its paper guide. First, printing data of only a color ink was sent to the printer to print patches and images on the recording media. Subsequently, printing data of a resin ink was sent to the printer to perform solid printing of the resin ink in the printed region of the color ink.

By replacing only thermoplastic resin particles used in the color ink set A1, a color ink set A2, a color ink set A3, and a color ink set A4 were obtained. That is to say, the color ink set A2 was obtained by replacing “styrene-acrylic acid copolymer (Tg=80° C., ϕ=50)” with “styrene-acrylic acid copolymer (Tg=60° C., ϕ=57)”. The color ink set A3 was obtained by replacing “styrene-acrylic acid copolymer (Tg=80° C., ϕ=50)” with “styrene-acrylic acid copolymer (Tg=40° C., ϕ=65)”. The color ink set A4 was obtained by replacing “styrene-acrylic acid copolymer (Tg=80° C., ϕ=50)” with “styrene-acrylic acid copolymer (Tg=20° C., ϕ=68)”. Printing was performed by an ink jet method using the color ink sets A2 to A4 and the resin inks B14 to B16 shown in Table 2 under the conditions (Examples 12 and 13 and Comparative Example 5) shown in Table 3. In addition, printing was performed by an ink jet method using an ink set (Example 14) in which the resin particles of the color ink and the resin ink were different from each other.

In Comparative Example 6, the printing order was reversed while the same color ink set and resin ink as those of Example 1 were used. In other words, printing data of the resin ink was sent to the printer to perform solid printing of the resin ink, and printing data of the color ink was then sent to the printer to perform printing of the color ink. In Comparative Example 7, printing of the color ink and resin ink was simultaneously performed using the same color ink set and resin ink as those of Example 1.

C: Slight scumming is visually confirmed in a non-printed area of the image-printed medium, and stains transferred from the recorded image can be visually confirmed on the white cotton cloth.

D: Clear scumming is visually confirmed in a non-printed area of the image-printed medium, and the white cotton cloth is stained due to the contact with the recorded image.

* Scumming is a phenomenon in which ink is attached to the non-printed area of a sheet. This phenomenon occurs when the printed area is rubbed and its surface is shaved off due to the evaluation of abrasion resistance, and stains are transferred on the non-printed area.

Evaluation of Clogging

After filling with inks, it was confirmed that the inks could be discharged from all nozzles using Ink Jet Printer PX-G930 (trade name, available from SEIKO EPSON CORPORATION, nozzle resolution 180 dpi). In consideration of the situation in which the printer has stopped working due to an unexpected accident such as power failure or the like, the power cord was disconnected when the printer was working, to stop the printer while the ink jet head was not covered with its head cap. After the printer was left standing at 40° C. and 20% Rh for 24 hours, the printer was turned ON again to evaluate the discharge conditions of the inks. The clogging was evaluated with the following criteria.

A: After the initial operation performed when the printer is turned ON, the inks can be discharged from all nozzles without any problem.

TABLE 3

| | | Ex 1 | Ex 2 | Ex 3 | Co 1 | Ex 4 | Ex 5 | Co 2 | Ex 8 | Ex 9 | Co 3 | Ex 10 | Ex 11 | Co 4 | Ex 12 | Ex 13 | Ex 14 | Co 5 | Co 6 | Co 7 |
|---|---|---|---|---|---|---|---|---|---|---|---|---|---|---|---|---|---|---|---|---|
| Color ink | | A1 | A1 | A1 | A1 | A1 | A1 | A1 | A1 | A1 | A1 | A1 | A1 | A1 | A2 | A3 | A1 | A4 | A1 | A1 |
| Resin ink | | B1 | B2 | B3 | B4 | B5 | B6 | B7 | B8 | B9 | B10 | B11 | B12 | B13 | B14 | B15 | B15 | B16 | B1 | B1 |
| Abrasion resistance | PET | A | A | A | A | A | B | C | A | A | B | A | A | A | A | B | B | C | D | C |
| | Polyvinyl chloride | A | A | A | A | A | B | C | A | B | C | A | A | A | A | B | C | D | D | C |
| | Paper-based medium | A | A | A | A | B | C | D | B | C | D | A | B | B | B | C | C | D | D | D |
| Clogging | Resin ink | A | B | C | D | A | A | A | A | A | A | B | C | D | B | C | C | D | A | A |

Ex: Example
Co: Comparative Example

The obtained recorded materials were evaluated as follows. Table 3 shows the results.

Evaluation of Abrasion Resistance

To evaluate abrasion resistance, a dried printed medium was set in Color Fastness Rubbing Tester AB-301 (trade name, available from TESTER SANGYO CO., LTD.), and rubbed 50 times using a friction element (load: 300 g) having a contact portion to which a white cotton cloth (conforming to JIS L 0803) was attached. The abrasion resistance was evaluated with the following criteria.

A: The image on the image-printed medium is not disturbed due to the friction, and stains are not transferred from the recorded image to the white cotton cloth.

B: The image on the image-printed medium is not disturbed due to the friction, but slight stains transferred from the recorded image can be visually confirmed on the white cotton cloth.

B: After the initial operation performed when the printer is turned ON, there are some nozzles from which the inks are not discharged. The inks can be discharged from all nozzles after several head cleaning cycles.

C: After the initial operation performed when the printer is turned ON, there are some nozzles from which the inks are not discharged. The inks can be discharged from all nozzles after several to ten head cleaning cycles.

D: After the initial operation performed when the printer is turned ON, there are some nozzles from which the inks are not discharged. The inks cannot be discharged from some nozzles even after ten or more head cleaning cycles.

E: After the initial operation performed when the printer is turned ON and even after ten or more head cleaning cycles, no inks are discharged.

Industrial Applicability

The invention has industrial applicability for a printing method that uses ink jet recording to form an image on a non-ink-absorbing or low-ink-absorbing recording medium.

What is claimed is:

1. A printing method that performs ink jet recording with a water-based ink set to form an image on a non-ink-absorbing or low-ink-absorbing recording medium, the method comprising:

a printing step including recording with a color ink and recording with a resin ink performed after the recording with the color ink; and a drying step performed during the printing step, after the printing step, or both;

wherein the water-based ink set includes the color ink containing a water-insoluble coloring agent and the resin ink not containing a coloring agent;

the color ink contains the water-insoluble coloring agent, a resin component, a water-soluble solvent, and a surfactant;

the resin ink contains a water-soluble resin solvent, a wax, and thermoplastic resin particles as a resin component that are insoluble in water but compatible in the water-soluble resin solvent; and a content of the thermoplastic resin particles in the resin ink is 4% by mass or more and 12% by mass or less, and a content of the wax in the resin ink is 0.5% by mass or more and 6% by mass or less.

2. The printing method according to claim 1, wherein the thermoplastic resin particles have a glass transition temperature of 40° C. or higher.

3. The printing method according to claim 1, wherein the color ink contains, as the resin component, the same thermoplastic resin particles and wax as those contained in the resin ink.

4. The printing method according to claim 1, wherein the color ink further includes special colors in addition to process colors and the special colors are constituted by orange and green.

5. A printing apparatus that performs the printing method according to claim 1.

6. The printing method according to claim 1, wherein the drying step is performed during the printing step.

7. The printing method according to claim 1, wherein the drying step is performed after the printing step.

8. The printing method according to claim 1, wherein the drying step is performed both during and after the printing step.

* * * * *